June 7, 1927.
A. J. ROOT
1,631,222
SHOCK ABSORBER
Filed July 19, 1926
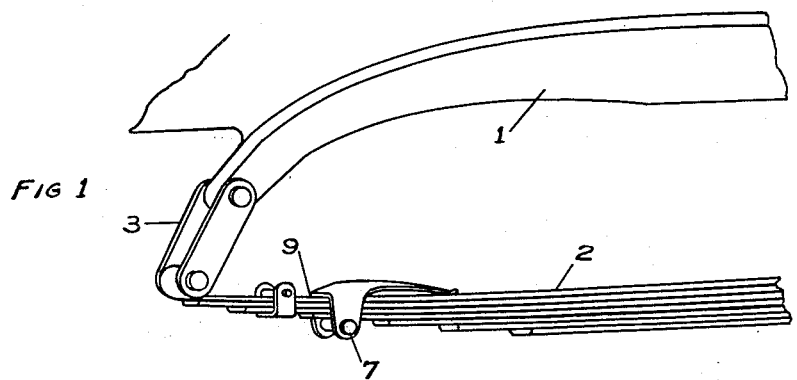
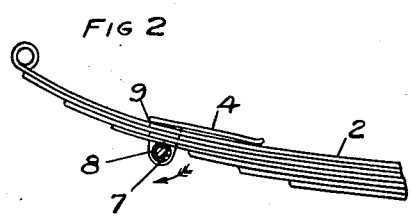
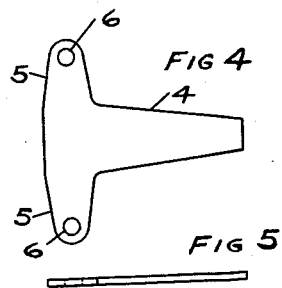
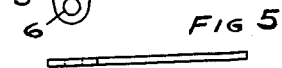
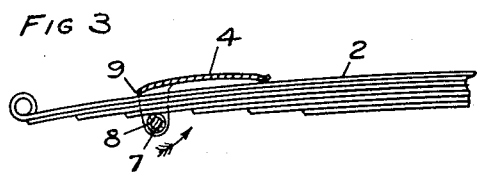
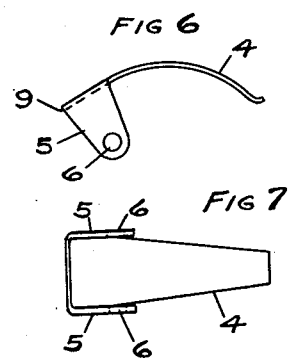
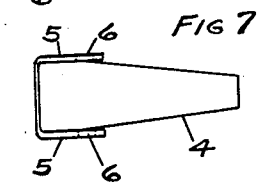
Inventor
Arthur J. Root
By
Staley J Bowman
Attorneys Patented June 7, 1927.

1,631,222

UNITED STATES PATENT OFFICE.

ARTHUR J. ROOT, OF SPRINGFIELD, OHIO.

SHOCK ABSORBER.

Application filed July 19, 1926. Serial No. 123,433.

My invention relates to shock absorbers for motor vehicles, it more particularly relating to a device of this character which has a direct action upon the springs to prevent rebound of the body by applying friction to the leaves of the springs while permitting the springs to have their normal free action when the axle and body approach each other during shock of road travel.

The object of my invention is to provide a simple and effective device of this description which is carried wholly by the spring and which may be readily installed upon the spring without alteration in any of the parts.

In the accompanying drawing:

Fig. 1 is a view in perspective of a portion of the frame of a motor vehicle and one of its springs showing my improvement applied thereto, the parts being shown in their normal relation.

Fig. 2 is a view of the portion of one of the springs with my improved device thereon showing the position assumed upon rebound of the body.

Fig. 3 is a view of one of the springs with my improved device thereon showing the position assumed when the body and axle approach each other.

Fig. 4 is a plan view of the blank from which my improved device is formed.

Fig. 5 is a side view of the same.

Fig. 6 is a side view of my improved device after being formed and before application to a spring.

Fig. 7 is a bottom plan view of the same.

Referring to the drawings, 1 represents a portion of the frame of a motor vehicle, 2 a portion of one of the springs and 3 a shackle connecting the spring and frame.

The device is formed from a single piece of sheet metal, cut or punched to the form shown in Figs. 4 and 5, and then bent to the form shown in Figs. 6 and 7 so as to constitute a bell-crank lever, the arms of which are arranged at an acute angle, with the short arm of a bifurcated nature so as to straddle the vehicle spring. The long arm is indicated at 4 and is curved as shown, while the two members of the short arm are indicated at 5, with their free ends formed with perforations 6 to receive a bolt or pin 7 about which is preferably placed a roller 8. The device thus constructed is tempered so that the arm 4 is in the nature of a comparatively stiff spring having a curvature before application to the vehicle spring substantially as shown in Fig. 6.

The device is applied to the vehicle spring preferably by employing a C-clamp, the jaws of which are engaged respectively with the vehicle spring and the long arm 4, the arm 4 being straightened out by the clamp to substantially the form shown in Fig. 1, which brings the apertures 6 to the opposite surfaces of the vehicle spring to permit the insertion of the bolt or pin 7.

When so applied the device has a bearing upon the vehicle spring at three points, i. e., at the free end of the arm 4, at the point indicated at 9 which will be termed the fulcrum point, and at the bolt 7 or roller 8 carried thereby when a roll is employed. It will be noted that the fulcrum point 9 and the roller pin 7 normally lie in different vertical planes, with the vertical plane of the pin between the vertical planes of the fulcrum 9 and the free end of the arm 4.

As a result of this arrangement, when the vehicle rides over an obstruction or drops into a depression and the body and axle approach each other, the vehicle spring will assume a position such as shown in Fig. 3 which tends to rock the device upon its fulcrum 9 in the direction of the arrow and thereby relieve the tension upon the spring arm or lever 4, and thereby relieve to some extent the gripping action of the fulcrum point 9 and the pin 7 upon the vehicle spring. As the body rebounds, however, the vehicle spring assumes the position shown in Fig. 2 which slightly rocks the device upon its fulcrum 9 in the opposite direction as shown by the arrow in Fig. 2. This rocking movement is resisted by the spring arm 4 which tends to straighten this arm and place the same under greater tension which causes an increased clamping action to be applied upon the leaves of the springs between the pin 7 and fulcrum point 9 and thereby check the rebound.

While I have shown the device so applied to the vehicle spring that the fulcrum point 9 and free arm of the lever 4 are on the upper surface of the spring and the pin 7 on the lower surface, this arrangement may be reversed.

Having thus described my invention, I claim:

1. In a shock absorber for motor vehicles, a device of bell-crank lever form with one arm bifurcated and the other arm curved and formed as a spring, the free ends of the members of the bifurcated arm being connected together, the juncture of the arms forming a fulcrum, the device being applied to a plurality of leaves of a vehicle spring in a manner to cause the same to grip the spring at three points defined by the free end of the curved arm, the connection between the members of the bifurcated arm and juncture of the arms, the connection between the members of the bifurcated arm being in a plane which intersects the curved arm at a point between the ends thereof.

2. In a shock absorber for motor vehicles, a device having two gripping points for gripping opposite surfaces of a vehicle spring in different parallel planes and also having a curved spring arm having a bearing point upon one of the surfaces of said springs and arranged to be placed under tension when the device is applied to the spring to thereby cause the two gripping points of the device to grip the spring.

3. In a shock absorber for motor vehicles, a device having a portion adapted to straddle a vehicle spring and provided with gripping points on opposite surfaces of said vehicle spring, and a formed curved spring arm extending from said gripping portion along one of the surfaces of said spring with its free end in contact therewith.

4. In a shock absorber for motor vehicles, a portion adapted to straddle a vehicle spring and provided with gripping points on opposite surfaces of said vehicle spring, and a formed spring arm extending from said gripping portion along one of the surfaces of said spring with its free end in contact therewith, the gripping point which is located on the opposite side of the vehicle spring from said arm being in a plane parallel to and between parallel planes passing through the other gripping point and the free end of said arm.

5. In a shock absorber for motor vehicles, a device formed as a bell-crank lever with a short bifurcated arm and a long curved arm arranged at an acute angle to each other, the bifurcated arm being adapted to straddle a vehicle spring, with means for connecting the free ends of the members of said bifurcated arm together on the opposite surface of said vehicle spring from said spring arm, the said connecting means and the point of juncture of said arms forming gripping points on opposite surfaces of said vehicle spring and held in gripping relation thereto by the tension of said spring arm, the tension of said spring arm being increased by the bending of said vehicle spring and by the action of the spring upon said gripping points upon the rebound of the vehicle body.

6. In a shock absorber for motor vehicles, a device comprising a spring arm adapted to be applied solely to a vehicle spring and having three points of contact therewith, two of said points of contact being on one of the surfaces of the vehicle spring, one of said two points being at the end of said spring arm, the third point of contact being on the opposite surface of the vehicle spring and being in a plane parallel to and between parallel planes passing through the other two points of contact.

7. In a shock absorber for motor vehicles, a device consisting of means for gripping opposite surfaces of a vehicle spring, and means consisting of a spring arm connected with said gripping means and bearing on said vehicle spring at a point removed from its connection therewith for increasing or diminishing the gripping contact of said gripping means by the action of said vehicle spring upon said gripping means as the contour of the vehicle spring changes under shock of road travel.

In testimony whereof, I have hereunto set my hand this 16th day of July, 1926.

ARTHUR J. ROOT.